United States Patent [19]

Maiste et al.

[11] 3,858,384
[45] Jan. 7, 1975

[54] CORN HEADER WITH AUTOMATIC ADJUSTMENT OF STALK ROLLS

[75] Inventors: Arved Maiste, Brantford, Walter F. Seton, Galt, both of Ontario, Canada

[73] Assignee: White Motor Corporation of Canada Limited, Brantford, Province of Ontario, Canada

[22] Filed: Mar. 21, 1973

[21] Appl. No.: 343,431

[30] Foreign Application Priority Data
Mar. 20, 1972 Canada .............................. 137510

[52] U.S. Cl. .................................. 56/14.2, 56/104
[51] Int. Cl. ........................................ A01d 45/02
[58] Field of Search ............ 56/106, 111, 112, 119, 56/14.1, 14.2, 104, 11.2

[56] References Cited
UNITED STATES PATENTS

| | | |
|---|---|---|
| 2,318,291 | 5/1943 | Christiance ........................... 56/14.2 |
| 2,647,353 | 8/1953 | Dort ...................................... 56/14.2 |
| 2,716,321 | 8/1955 | Schaaf et al. ........................... 56/104 |
| 3,271,940 | 9/1966 | Ashton et al. ..................... 56/119 X |
| 3,600,876 | 8/1971 | Tarzer .............................. 56/104 X |

Primary Examiner—Louis G. Mancene
Assistant Examiner—J. N. Eskovitz
Attorney, Agent, or Firm—Fred S. Lockwood

[57] ABSTRACT

A corn header which includes a pair of harvesting rolls and associated stripper plates and trash knives mounted on a frame structure which is adapted to be supported in cantilever fashion on a gear housing at the forward end of a combine, each roll and its associated elements being hingedly mounted on the gear housing and sharing common load sensitive support anchors at the front end which permit the assemblies to yield outwardly if the crop density exceeds a predetermined pressure level on the rolls and to return to their pre-set location automatically after ejection of such crop concentration without losing their adjustment relative to each other.

7 Claims, 6 Drawing Figures

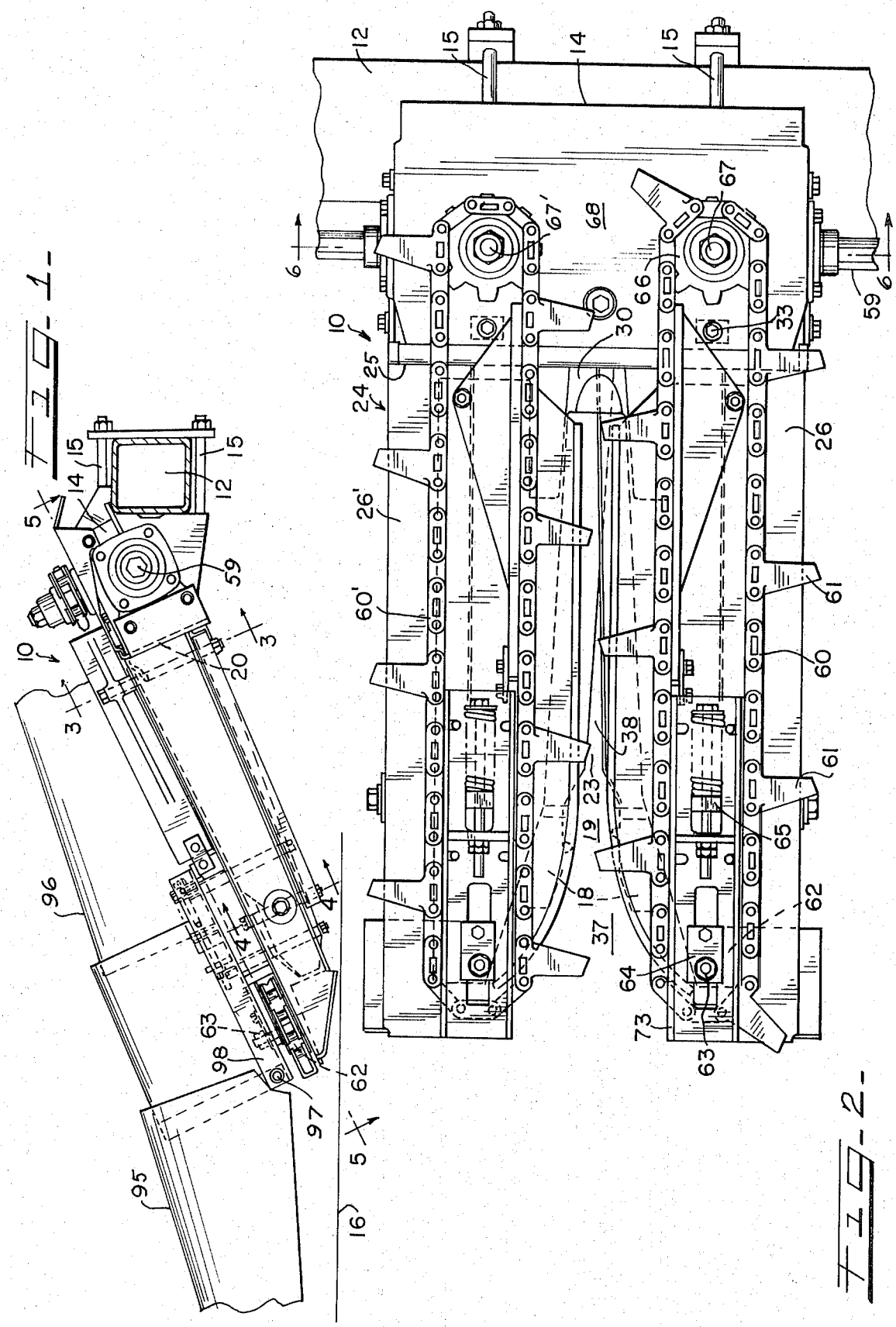

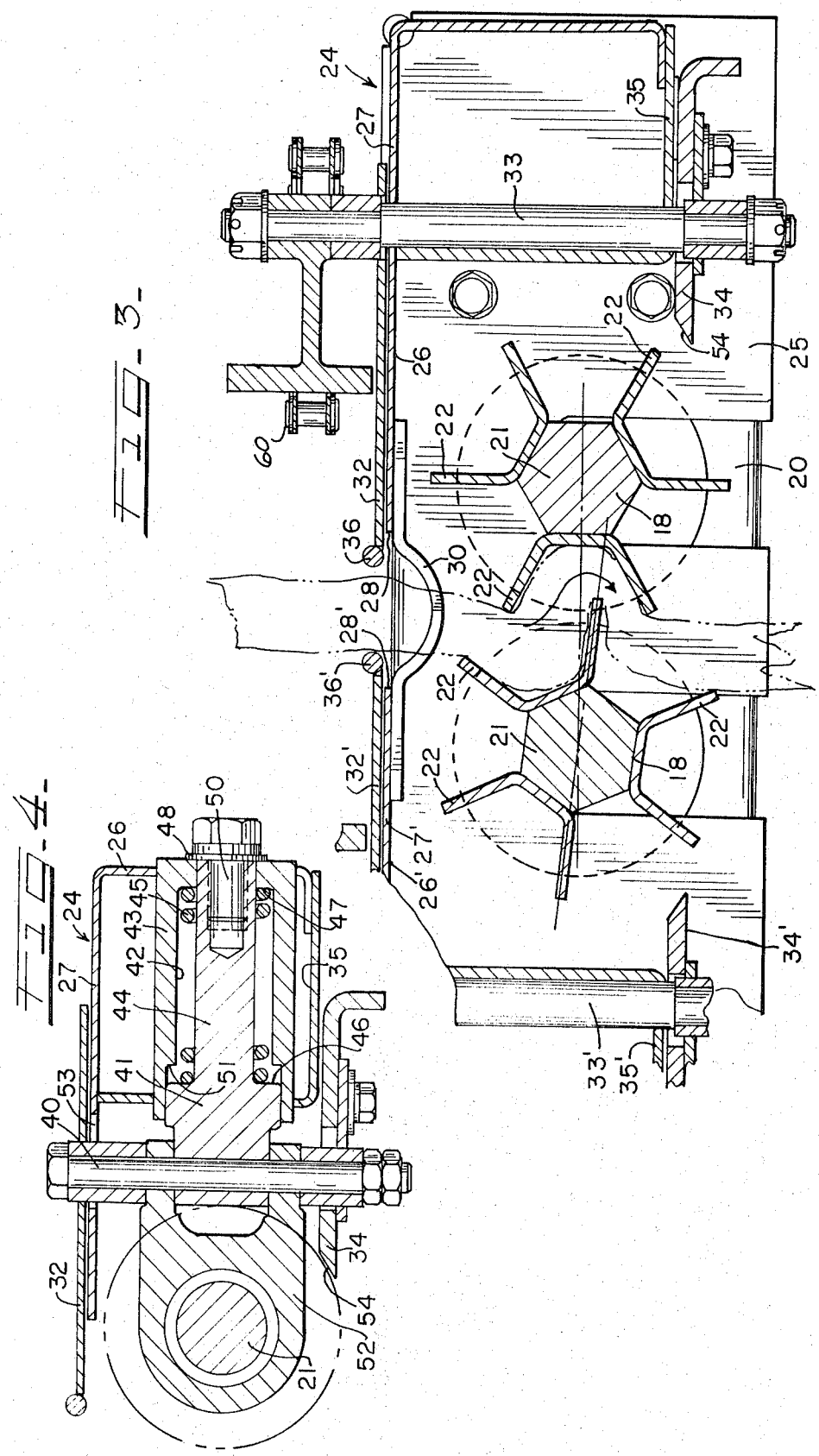

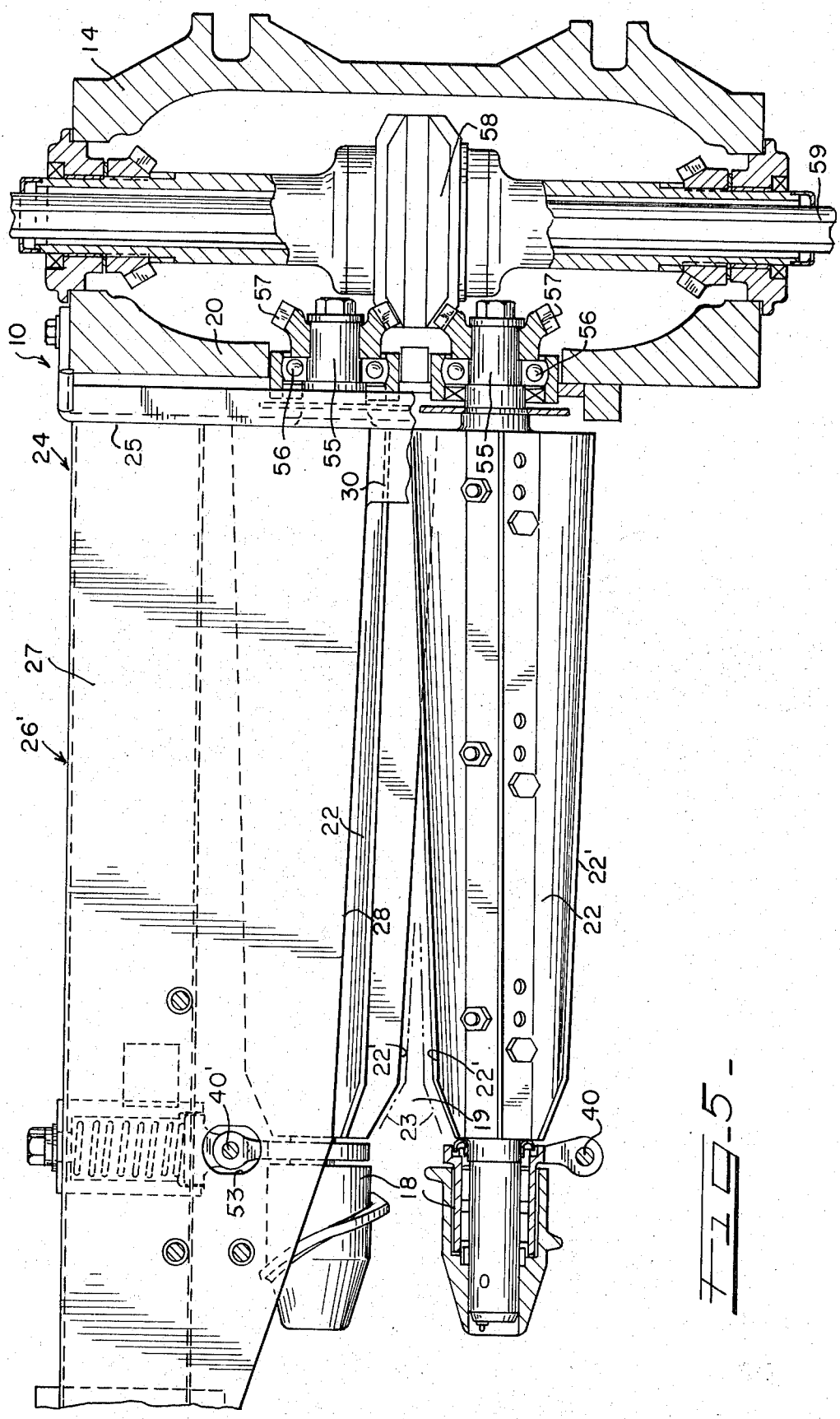

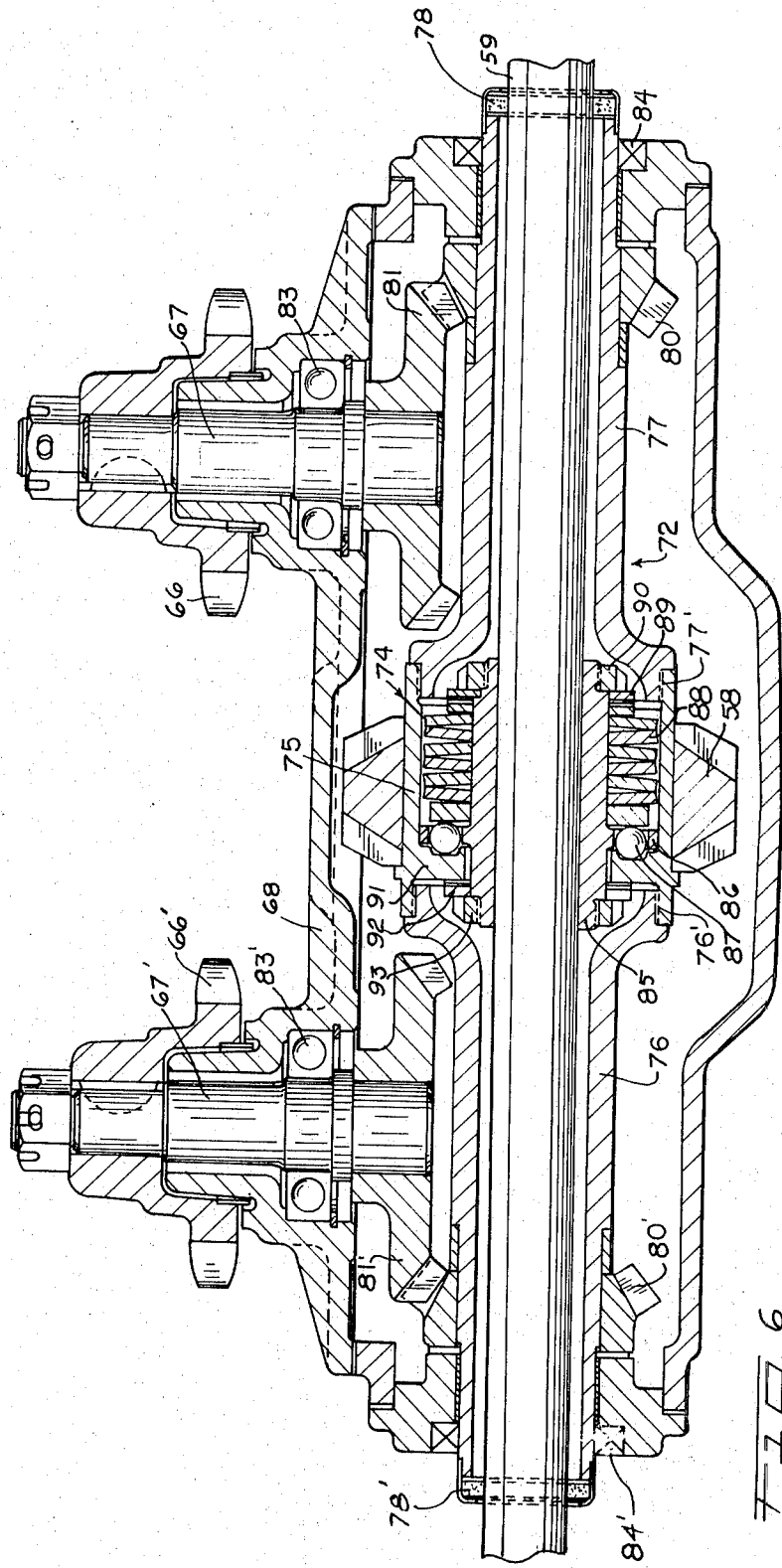

CORN HEADER WITH AUTOMATIC ADJUSTMENT OF STALK ROLLS

This invention relates to crop harvesting apparatus and is more particularly concerned with improvements in corn harvesting rolls and associated structure which are adapted to be supported on a gear housing in cantilever fashion so as to project forwardly thereof on a harvesting combine.

Corn harvesting heads have heretofore been provided for corn harvesting combines which include pairs of stalk rolls or snapper rolls, with associated stripper plates and trash knives, supported on a frame extending forwardly of the combine, the rolls being in fore and aft disposition on opposite sides of a fore and aft extending stalk passage and being provided with blades which operate to grip the stalks and draw them downwardly between the associated stripper plates or bars until the ears of corn contact the bars and are detached from the stalks. Generally provision has been made for adjusting the individual elements so as to provide for most efficient stripping and stalk control under the operating conditions which are encountered. Since crop spacing and density may very considerably, proper adjustment to avoid jamming and to insure efficient operation has often been a problem. It is a general object, therefore, to provide a corn harvesting head with automatic adjusting features so that the apparatus will operate efficiently under varying conditions encountered in the field.

A more specific object of the invention is to provide a corn harvesting head adapted to be supported on the forward end of a crop harvesting combine which incorporates pairs of co-operating stalk rolls with associated stripper plates and trash bars, together with a means for adjusting the position of the assemblies formed thereby so as to accommodate variations in the crop density without disturbing the adjustment of the elements of each assembly relative to each other.

It is a still more specific object of the invention to provide a corn head for a crop harvesting combine wherein stalk rolls are supported in cantilever fashion on a gear housing at the front of a combine with the rolls extending fore and aft and having associated ear stripping plates and trash knives which are hinged to the gear housing and at the forward ends share common load sensitive support anchors which permit the components to yield outwardly if the crop density exceeds a predetermined pressure level on the rolls and to return to their normal location automatically after such crop concentrations have been ejected without losing relative adjustment to each other during this motion cycle.

These and other objects and advantages of the invention will be apparent from a consideration of the corn header which is shown by way of illustration in the accompanying drawings wherein:

FIG. 1 is a side elevational view, with portions broken away, of a corn header which is attached to the front end of a harvesting combine and which embodies the invention;

FIG. 2 is a plan view of the apparatus shown in FIG. 1, to a larger scale, and with portions thereof omitted;

FIG. 3 is a cross sectional view taken on the line 3—3 of FIG. 1, to an enlarged scale;

FIG. 4 is a cross sectional view taken on the line 4—4 of FIG. 1, to an enlarged scale;

FIG. 5 is a sectional view taken generally on the line 5—5 of FIG. 1, to an enlarged scale and with portions broken away; and FIG. 6 is a cross sectional view taken on the line 6—6 of FIG. 2, to a larger scale.

Referring to FIGS. 1 and 2, the corn harvesting head 10 is adapted to be supported on a cross beam 12, which, in the apparatus contemplated, constitutes a part of the forward framing of a combine or which is attached to the combine so as to extend transversely of the path of travel of the combine during the harvesting operation. The corn header 10 includes, at its rearward or trailing end, a gear housing 14 in which the drive mechanism is encased. The housing 14 is secured to cross beam 12 by bolts 15 so that the entire header assembly 10 is inclined forwardly and downwardly toward a ground level which is indicated at 16.

The header assembly 10 includes a pair of stalk rolls 18 (FIGS. 2, 3 and 5) which are disposed in fore and aft relation and which extend forwardly of the housing 14 in spaced relation. The spacing between the rolls 18 is such that a path 10 (FIGS. 2 and 5) is provided for passage of the corn stalks. The stalk rolls or harvesting rolls 18 are of identical construction except for being rights and lefts. These rolls are mounted on the forward face 20 of the gear housing 14 in cantilever fashion and adapted to swing on laterally spaced, parallel axes. Each of the rolls 18 comprises a roll shaft 21 (FIG. 3) and a series of radially extending blades 22. The blades 22 are peripherally spaced and have tapered edges 22' (FIG. 5) extending longitudinally from the rear to the forward end of the rolls, the taper being such and the spacing of the roll shafts 21 being such that the blades overlap or interleave as shown in FIGS. 3 and 5 at the trailing end of shafts 21 while at the forward ends of the shafts they are traveling in spaced paths as indicated at 23. The blades 22 on the two roll shafts 21 are positioned circumferentially, by relative shaft rotation, so that they coact in gripping the stalks, that is, the edges of the blades of the respective shafts are moved out of time, by a relatively small amount or degree, so as to increase their aggressiveness by forming alternating narrow and wide gaps between the gripping edges, as illustrated in FIG. 3, which better feeds the corn stalks downwardly between the same.

A generally U-shaped support frame 24 (FIGS. 2, 3 and 4) is attached in forwardly extending relation to the cross beam 12 by means of an end plate 25 which is bolted to the forward face and the ends of the gear housing 14. The support frame 24 includes elongate box-like frame sections 26, 26' equally spaced on opposite sides of the center line of the assembly, and extending longitudinally of the assembly, or fore and aft relative to the frame end plate 25. Each of the box-like frame sections 26, 26' has a top plate 26, 27' with the inner, confronting edges 28, 28' tapered outwardly, in diverging relation in the direction of the free ends thereof so as to afford a gradually restricted passage or path for the corn stalks leading to a bridge-forming plate member 30 adjacent the end plate 25. The frame sections 26, 26' provide a support or mounting frame for stripper plates 32, 32' (FIGS. 2, 3 and 4) which are mounted on the hinge pins 33, 33' and which are disposed immediately above the top frame plates 27, 27'. The frame sections 26, 26' support also trash knives 34, 34' which are mounted below the bottom frame plates 35, 35'. The stripper plates 32, 32' extend fore and aft with the major portion of their confronting edges 36, 36' generally parallel while at their free ends, the edges 36, 36' curve away from each other so as to provide an entrance throat 37 (FIG. 2) and a restricted passage 38 for the corn stalks which terminates at the bridge plate 30.

The roll shafts 21 and the associated stripper plates 32, 32' and trash knives 34, 34' constitute separate assemblies which are supported at the forward or leading ends of the members on vertically disposed anchor pins 40, 40' (FIG. 4). The supporting arrangement is the same for each of these assemblies and only one is described in detail. The vertically disposed anchor pin 40 is mounted for limited lateral movement in the free end of the associated frame section 26. The pin 40 is mounted on the inner end of a transversely extending plunger or slide member 41 which is mounted in the bore 42 of a cylindrical support member 43, the latter being in turn mounted in the frame section 26. The slide member 41 has a stem forming portion 44 of reduced cross section on which there is received a compression spring 45 with one end seated against the shoulder 46 and the other end seated against the internal flange 47 in the bore 42. A pre-set stop member 48 is secured on the outer end of the slide 41 by means of a stud 50 and normally bears on the outer face of the guide sleeve 43 so as to limit the inward movement of the carriage forming slide member 41. A shoulder 51 in the bore 42 limits the outward movement of the slide member 41. The roll shaft 21 is attached to the anchor pin 40 by a bracket member 52 while the stripper plate 32 and the trash knife 34 are attached to the top and bottom ends of the pin 40. The top frame plate 27 is slotted at 53 to accommodate the movement of the pin 40. The trash knife 34 is adjustably connected to the pin 40 so as to enable the inner edge 54 to be positioned close to the path of the blades 22 on the roll shaft 21 as shown in FIG. 4.

The roll shafts 21 (FIG. 5) are mounted at their rear ends for swinging movement in an identical manner on the front wall 20 of the gear housing 14. The roll shafts 21 are supported at their trailing or rear ends 55 by spherical bearing assemblies 56 which are mounted in spaced relation in the housing wall 20 so as to permit limited pivoting or swinging movement of the rolls 18 in a lateral direction on vertical axes. A bevel gear 57 is carried on each shaft end 55 and meshes with a common drive gear 58 which is connected to an input power drive shaft 59.

The frame section 26 supports on its top face a gathering chain 60 (FIG. 2) on which there are spaced stalk engaging lugs 61 extending outwardly in the plane of the chain. The chain 60 travels on a sprocket 62 on an upstanding shaft 63 which is mounted in a slidable support bracket or bearing member 64 with an associated tensioning assembly 65 of conventional construction. At the opposite end of the frame section 26 the chain 69 is mounted on a drive sprocket 66 supported on an upstanding shaft 67 which is journaled in the removable top plate 68 of the gear box housing 14 and connected in driving relation with the input power shaft 59. A co-operating gathering chain 60' is supported on the frame section 26' and mounted at the trailing end on a drive sprocket 66' supported on the upstanding shaft 67' which is journaled in the gear box top plate 68 and connected in driving relation with the power shaft 59.

The gear 58 for driving the rolls 18 is mounted on a tubular output shaft assembly 72 (FIG. 6) which is in turn mounted on the hexagonal power input shaft 59. The power shaft 59 is connected in driving relation with the tubular output shaft assembly 72, through which it extends, by means of a safety clutch assembly 74 which is housed within the center drive gear 58 and forms an integral part of the latter. The gear 58 is mounted on the outer tubular member 75 of the safety clutch 74 which member 75 is normally driven upon rotation of the input power shaft 59. The tubular outer clutch member 75 has driving connections with right and left hand tubular sections 76 and 77 of the output shaft assembly 72, the drive connections being indicated at 76' and 77'. Thus the clutch member 75 forms a connecting section for the tubular shaft sections 76 and 77. Suitable seal assemblies 78 and 78' are provided at the outer ends of the shaft sections 76, 77 which enable the operating elements of the clutch assembly 74 to be submerged in a special clutch lubricant and sealed to exclude foreign materials, dust and moisture so as to provide maximum life of clutch components.

The tubular shaft sections 76 and 77 (FIGS. 3, 4 and 6) of the output shaft assembly 72 carry at their respective outer ends gears 80 and 80' which are in driving engagement with bevel gears 81 and 81' on the lower ends of vertically disposed drive shafts 67 and 67' for the gathering chains 60 and 60'. The drive shafts 67 and 67' are mounted in suitable bearings 83 and 83' in the removable top cover plate 68 on the housing 14. Some adjustment axially of the shaft assembly 72 is provided for the gears 80 and 80' so as to permit variations in the spacing of the gathering chains 60 and 60'. The gear box or housing 14 is provided in opposite ends with suitable bearing and seal assemblies 84 and 84' which prevent the passage of fluid along the shaft members 76 and 77. The readily removable cover plate member 68 is provided with suitable sealing gaskets and the shafts 67 and 67' are provided with suitable sealing means. The gear box 14 may thus provide a sealed compartment which may be filled with a suitable lubricant permitting the entire drive mechanism to be submerged in the lubricant.

The safety clutch assembly 74 in the form illustrated in FIG. 6 comprises a hub member 85 which is slidably mounted and axially adjustable on the hexagonal power input shaft 59. The hub member 85 has an outwardly directed radial flange 86 with spaced apertures in which ball members 87 are held by pressure of Bellville springs 88 bearing at the end of the hub on a needle bearing and thrust race assembly 89, the latter held thereon by nut 90. The ball members 87 normally seat in co-operating spaced pockets or sockets in an inwardly extending radial flange 91 on the outer sleeve forming drive member 75, the flange 91 bearing against a thrust plate assembly 92 which is held on the hub end by nut 93. The entire assembly 74 will rotate with the input shaft 59 under normal load. When the load exceeds a predetermined value the Bellville springs 88 will be compressed and the ball members 87 will ride up out of the sockets in the flange 91 thus breaking the driving connection between the hub member 85 and the outer drive member 75.

At the forward end or entrance end of the frame section 26 a shroud 95 of tapered configuration is mounted and extends from the end of a top cover or shield assembly 96. The cover 96 is pivoted at 97 on a portion of the bracket 98 on which the chain tensioning device 65 is mounted and extends over the frame section 26. The cover member 96 may be swung about the pivot 97 to provide access to the gathering chain 60 and roll 20. A like cover or shroud arrangement is provided on the frame section 26.

In describing the anchor pins 40, 40' and the pivot axes at the rear ends of the roll shafts 21 and the chain drive shafts 67, 67' as vertically disposed or vertical it will be understood that these elements are not truly vertical but they are upright or upstanding and, in normal operating position as shown in FIG. 1, they will be inclined forwardly relative to a truly vertical plane.

While a single header unit or assembly 10 is illustrated, which is designed for harvesting a single row of corn, it will be understood that in normal operations more than one such unit or assembly 10 will be employed. By loosening the bolts 15 the position of the assembly 10 may be adjusted along the support beam 12. The support beam 12, in the normal combine, will have a length sufficient to support at least three of the header units 10. The input power shaft 59 will be of sufficient length to accommodate the number of header units employed, with the gear box 14 and the enclosed drive assemblies being slidable on the power shaft 59 so as to permit adjustment of the units 10 axially on the shaft 59.

We claim:

1. A corn harvester adapted to be mounted at the forward end of a harvesting combine comprising: an elongate gear box mounted with its longitudinal axis generally horizontal and extending transversely to the fore and aft axis of the combine; a U-shaped support frame having its bight portion mounted on said gear box with its leg portions parallel and extending forwardly and having a generally rectangular box-like structure with horizontal top and bottom plate members and vertical inner and outer side plate members with the outer side plate members being approximately flush with the adjacent opposite ends of said gear box; a pair of stalk rolls extending forwardly in between said leg portions with the rear end of each stalk roll pivotally mounted in a bearing carried on the front wall of said gear box so that the front ends of said rolls are swingable toward and away from each other in approximately the same plane; a stripper plate mounted flatwise on the top of each of said leg portions with the rear end of each stripper plate being pivotally mounted so that the front ends thereof are swingable toward and away from each other in approximately the same plane which is above and approximately parallel to said plane in which the front ends of said stalk rolls swing; a trash knife mounted on the underside of each of said leg portions with the rear end thereof being pivotally mounted so that the front ends thereof are swingable toward and away from each other in approximately the same plane which is below and approximately parallel to said plane in which the front ends of said stalk rolls swing; a gathering chain mounted above each of said leg portions and extending substantially the full length thereof; means for supporting the front end of each stalk roll from the adjacent one of said leg portions comprising a generally vertically disposed laterally shiftable support pin, a bearing bracket pivotally mounted on said support pin with a bearing supporting the front end of the adjacent one of said stalk rolls, a transversely reciprocable slide member on the inboard end of which said shiftable support pin is mounted, means supporting and guiding said slide member in its reciprocable movement in an inboard-outboard direction with respect to the adjacent one of said leg portions, and means for biasing said slide member in the inboard direction, and stop means limiting the inboard movement of said slide member; means connecting the front end of each of said stripper plates to the upper end of the adjacent one of said vertical support pins so as to be movable therewith; and, means connecting the front end of each of said trash knife to the lower end of the adjacent one of said vertical support pins so as to be movable therewith.

2. A corn header as set forth in claim 1 wherein said slide member and said means for supporting and guiding said slide member have telescoping portions and said biasing means is a compression spring interposed between said telescoping portions.

3. A corn harvesting apparatus as set forth in claim 1 wherein the innermost edges of said stripper plates are spaced so as to provide a path for crop material.

4. A corn harvesting apparatus as set forth in claim 1 wherein said stalk rolls have radially and axially extending blades with the free outer edges thereof tapered inwardly in the direction of the forward ends of the stalk rolls so as to rotate in paths which converge in the direction of the rearward ends of the rolls.

5. A corn harvesting apparatus as set forth in claim 1 wherein said stalk rolls are spaced laterally with the blades on each roll interleaving with the blades on the associated roll throughout a portion of the length of the rolls and means is provided for driving the rolls so that the edges of the blades grip the stalks and feed the stalks downwardly between the rolls, said driving means being adjusted so that there are alternating narrow and wide gaps between the stalk engaging blade edges as the rolls rotate.

6. A corn harvesting apparatus as set forth in claim 1 wherein said gathering chains are supported at their rearward ends on said gear box and at their forward ends on free end portions of said leg portions of said U-shaped support frame.

7. A corn harvesting apparatus as set forth in claim 1 wherein said gathering chains are supported at the forward ends thereof on said stalk roll mounting means for lateral movement with said stalk rolls.

* * * * *